3,126,932
METHOD OF DEHULLING SOYBEANS
Donald F. Moran, Chicago, and Frank A. Norris, La Grange, Ill., assignors to Swift & Company, Chicago, Ill., a corporation of Illinois
No Drawing. Filed Sept. 10, 1959, Ser. No. 839,056
4 Claims. (Cl. 146—221.7)

The present invention is directed in general to an improved treatment of soybeans. More particularly, this invention relates to a method for conditioning soybeans whereby dehulling is facilitated and a high protein, low fiber content soybean meal can be prepared.

Soybean meal is being used in increasing quantities in animal feeds, particularly in feed for fowl where low fiber is important. With this increased use, there is an increasing demand for a higher protein, lower fiber meal than the usual 44% protein variety. A meal made from beans having a higher proportion of the hull material removed than in previous bean operations will have a decreased amount of fiber and a higher protein content.

However, the soybean industry has encountered difficulties in the dehulling of the beans. The biggest problem in dehulling is to prevent kernel particles from adhering to the hulls when the beans are cracked. Some processes resort to soaking of the beans, or some manner of treatment with moisture (for example, steaming) to loosen the hulls. This moisture treatment is objectionable in that the beans must be washed to remove the loosened hulls and then retreated and rewashed a number of times to effect complete hull removal. If and when the hulls are completely removed the kernels must be dried, thus involving a separate operation with added expense. Other processes utilize a relatively lengthy cooking operation (usually in water or in oil) wherein the beans may be subjected to high temperatures and pressures. This treatment is objectionable for a number of reasons, including nutritional impairment of the soybean protein and damage to the soybean oil.

Another method of dehulling in use today involves heating soybeans to relatively low temperatures of about 120° F. The beans are then given a necessary storage period of about one or two weeks prior to cracking of the beans and removal of the hulls. While this is a reasonably effective method, it requires segregated storage facilities and increased handling, and it is found that even cracking the beans so treated does not loosen all of the hulls and pieces of the kernel often remain stuck to the hull.

It is therefore a principal object of our invention to provide a method of conditioning soybeans such that the hulls will become fragile, are easily cracked, and separate cleanly from the kernels.

A further object of the invention is to provide a method for dehulling soybeans such that meal made therefrom possesses a high protein content, about 50%, and a low fiber content, less than about 3% by weight.

Other objects and advantages of the invention will become apparent to those skilled in the art from a reading of the following description of our invention.

We have found that dehulling efficiency can be greatly improved by conditioning the soybeans prior to the cracking and hull-removing operations. This conditioning step comprises raising the temperature of the soybeans to an average temperature of about 160° F. or more by means of dry heat, and promptly lowering the temperature of the beans to about 100° F. or less, and preferably to below about 80° F. When treated in this fashion the soybean hulls become fragile, are easily cracked, and separate cleanly from the kernels. Our process is normally carried out under atmospheric conditions.

In heating the beans we have found that it is desirable to merely raise the temperature of the beans to the desired degree; it is not necessary that they be held at that temperature for any given period. It is apparent that any of a variety of heating devices operating at various temperatures could be used for raising the temperature of the soybeans. For example, short contact with very hot air will do a comparable job to longer contact with cooler air. However, it is obviously uneconomical to use a higher temperature air than necessary. Furthermore, if the contact time were sufficient to permit the entire bean to be raised to an excessive temperature, e.g. above about 225° F., there would be an adverse effect on the quality of the oil recovered in any subsequent extraction process.

We have previously spoken of the desired heat treatment raising the temperature of the soybeans to an average temperature of about 160° F. This wording is intended to convey the idea that all of the beans do not necessarily reach the same temperature. For example, in practicing our invention we heat the beans in a conventional grain-type dryer which heats by means of hot air from a burner and cools by means of pulling in cool air from the outside. Due to the construction of this type dryer there will be variations in the temperatures to which the beans are raised caused by unequal amounts of hot air contacting some of the beans and differences in hot air temperatures in various sections of the dryer caused by uninsulated duct work, through which the air passes in going to the beans. Therefore, when operating in such a heating apparatus, it is probable that the temperature will not be uniform and may vary to the extent that the bean temperatures may be in the range of 160° F.±10° F., with the average temperature of the beans being about 160° F. Thus, while more expensive heating devices that would allow substantially uniform heating of the beans could advantageously be used, it is not required that this extra expenditure be made, provided the apparatus used will heat the beans to an average temperature of about 160° F. or more.

Higher temperatures, up to about 225° F., can be used, but with no appreciable increase in dehulling efficiency and, of course, at the added cost of producing the higher temperatures. Furthermore, treatment at temperatures above about 225° F. may cause excessive damage to the extracted oil. Therefore, when heating the beans we preferably raise the temperature thereof to a degree insufficient to adversely affect the quality of the soybean oil.

After raising the temperature of the soybeans to the desired degree, we promptly cool the beans to about 100° F. or less, and preferably to below about 80° F. The cooling may be, and preferably is, accomplished substantially immediately after the beans have reached the desired temperature in the heating operation. However, it is not necessary that the cooling be immediate, provided it is carried out within a few hours after the beans have been heated, and in any event before the beans are held for a sufficient time to equilibrate the moisture conditions in the hulls and kernels thereof. The cooling may be effected by passing outside air over the beans. An alternative procedure would be to drop the beans over tubes filled with cold water. Any substantially dry procedure for lowering the temperature of the beans to about 100° F. or less is effective for our purposes. We have found the maximum temperature of 100° F. on cooling to be required in order to render the soybean hulls fragile and easily removable. For example, promptly cooling beans to 120° F. after heating them to the optimum 160° F. was found not to improve dehulling.

After cooling, the conditioned soybeans can be immediately delivered to dehulling equipment and should be so delivered before equilibration of moisture occurs in the beans. The hulls are preferably removed by cracking the beans and dehulling by air aspiration, or suction. The cracking and aspirating operations are well known in the art. Operating in the manner described effects substantially complete removal of the hulls, i.e. yields soybean meal possessing less than 3% fiber content, by weight of the meal.

After the conditioning operation the hulls are fragile, crack easily, and separate cleanly from the kernels. We do not wish to be limited to any particular theory as to the mechanics by which our process brings about such a marked improvement in dehulling. However, while the heat treatment necessarily involves some drying, it appears that drying itself is not sufficient since soybeans dried in the presence of calcium chloride or by immersion in acetone do not dehull easily even though their moisture content is appreciably reduced. It is for this reason, and also the fact that the kernel itself can be quite moist if the hull is dry and fragile, that we have not attempted to define the first step of our conditioning procedure in terms of reducing the moisture content of the beans to a particular percentage, but have used heating and cooling temperatures to set forth the process. Normally, however, when operating under our conditions the soybeans will have a moisture content of between about 7–12%, by weight, after the heat treatment and before cooling.

After the beans are conditioned and the hulls removed the oil may be extracted from the soybean kernels by mechanical expression, or preferably solvent extraction. The oil extraction procedure is conventional and forms no part of our invention except at is is used along with our conditioning operation. The soybean meal will have a protein content of at least about 50% and will contain less than about 3% fiber by weight.

The following examples of our novel and improved method of dehulling are presented for the purposes of illustration only and are not to be construed as limiting the scope of the appended claims.

*Example I*

Fresh soybeans, screened to remove trash, were subjected to a dry heat treatment at atmospheric pressure in a conventional hot air grain dryer. The beans were brought to a temperature of 160° F. After reaching this temperature the beans were allowed to pass into the section of the dryer where cool air was circulated, having been pulled in from the outside. The beans remained in this section of the dryer until their temperature had been lowered to 100° F. The cooled beans were then immediately conveyed to dehulling equipment where they were cracked and the hulls removed by air aspiration. After dehulling, oil was removed by solvent extraction. The oil had a bleached color of 1.2 red, a fatty acid content of 0.5%, and a refining loss of 3.50%, indicating good quality oil. The soybean meal analyzed 51.9% protein, 2.74% fiber, 12.0% moisture and 0.9% oil.

*Example II*

Cleaned soybeans were heated to 225° F. by means of hot air in a conventional hot air grain dryer. Cooling followed immediately using outside air drawn over the beans by means of a fan. The cooled beans left the dryer at 70° F. and were immediately conveyed to cracking rolls, where the whole beans were broken up into smaller pieces from which the liberated hulls were removed by screening and aspiration. The dehulled, cracked soybeans were then solvent extracted, yielding products of the following composition:

| Oil: | Percent |
|---|---|
| Free fatty acid | 0.5 |
| Refining loss | 3.40 |
| Bleached color, red | 1.2 |
| Meal: | |
| Moisture | 12.1 |
| Oil | 1.0 |
| Protein | 51.8 |
| Fiber | 2.68 |

Obviously, many modifications and variations of the invention as hereinbefore set forth may be made without departing from the spirit and scope thereof, and therefore only such limitations should be imposed as are indicated in the appended claims.

We claim:

1. A method of conditioning soybeans for easy and substantially complete removal of the hulls thereof which comprises: raising the average temperature of soybeans to more than about 160° F., by contacting said beans with dry heat, promptly thereafter lowering the temperature of said beans to a temperature of less than 100° F., and removing the hulls therefrom.

2. A method of conditioning soybeans for easy and substantially complete removal of the hulls thereof, which comprises: raising the average temperature of the said beans to between about 160° F. and 225° F. by contacting said beans with dry, hot gases, promptly thereafter lowering the temperature of said beans to less than about 100° F., and removing the hulls therefrom.

3. A method of conditioning soybeans for easy and substantially complete removal of the hulls thereof, which comprises: subjecting soybeans to a dry, hot air treatment sufficient to raise the temperature of the beans to above about 160° F. but insufficient to adversely affect the quality of the soybean oil, promptly thereafter cooling the beans to below about 100° F. whereby the hulls will be fragile and will separate cleanly from the soybean kernels, and removing the hulls therefrom.

4. A method for conditioning soybeans for easy and substantially complete removal of the hulls thereof, which comprises: contacting said soybeans with dry, hot air sufficient to raise the temperature of the soybean hulls between about 160° F. and 225° F., promptly thereafter passing a current of cool air over the beans to lower the temperature thereof to below about 100° F., and removing the hulls therefrom.

References Cited in the file of this patent

UNITED STATES PATENTS

| Re. 10,275 | Teter | Jan. 23, 1883 |
| 617,266 | Watson | Jan. 3, 1899 |
| 2,557,555 | Miner | June 19, 1951 |
| 2,979,097 | Roger et al. | Apr. 11, 1961 |
| 2,995,166 | Burley et al. | Aug. 8, 1961 |